(12) United States Patent
Walden (10) Patent No.: US 8,756,903 B2
(45) Date of Patent: Jun. 24, 2014

(54) WORK VEHICLE WITH STROKE ADJUSTMENT MECHANISM FOR SUSPENDED WORK IMPLEMENT UNIT

(75) Inventor: Robert Walden, Gainesville, GA (US)

(73) Assignee: Kubota Corporation, Osaka (JP)

( * ) Notice: Subject to any disclaimer, the term of this patent is extended or adjusted under 35 U.S.C. 154(b) by 274 days.

(21) Appl. No.: 13/425,795

(22) Filed: Mar. 21, 2012

(65) Prior Publication Data

US 2013/0247528 A1 Sep. 26, 2013

(51) Int. Cl.
*A01D 34/74* (2006.01)
*A01D 34/00* (2006.01)

(52) U.S. Cl.
USPC ............................................. 56/15.8; 56/17.1

(58) Field of Classification Search
USPC ............. 56/15.7, 15.8, 17.1, 14.9, 15.9, 16.3, 56/16.7, 320.1, 15.2
See application file for complete search history.

(56) References Cited

U.S. PATENT DOCUMENTS

| 3,654,749 | A | * | 4/1972 | Ostergren et al. | 56/15.8 |
| 4,120,136 | A | * | 10/1978 | Rose | 56/17.1 |
| 4,747,257 | A | * | 5/1988 | Hutchison | 56/15.8 |
| 4,760,686 | A | * | 8/1988 | Samejima et al. | 56/15.8 |
| 5,123,234 | A | * | 6/1992 | Harada et al. | 56/10.2 E |
| 5,381,648 | A | * | 1/1995 | Seegert et al. | 56/17.1 |
| 5,816,033 | A | * | 10/1998 | Busboom et al. | 56/10.8 |
| 6,122,903 | A | | 9/2000 | Hayashi et al. | |
| 6,530,200 | B1 | * | 3/2003 | Minoura et al. | 56/17.1 |
| 6,658,831 | B2 | * | 12/2003 | Velke et al. | 56/14.7 |
| 6,837,032 | B1 | * | 1/2005 | Swartzendruber et al. | 56/14.9 |
| 6,868,658 | B2 | * | 3/2005 | Velke et al. | 56/15.8 |
| 7,770,370 | B2 | | 8/2010 | Komorida et al. | |

* cited by examiner

*Primary Examiner* — Robert Pezzuto
(74) *Attorney, Agent, or Firm* — Greenblum & Bernstein, P.L.C.

(57) ABSTRACT

A work vehicle including a control device for moving an implement through a mechanism including an adjustment mechanism for locking the work implement unit with a predetermined stroke position including a rod, a cam engaging unit mounted on the rod and a cam for producing rotation with the cam engaging unit. The cam retains the work implement in a retaining position through first operational movement of the control device for moving the work implement unit from a basic position to a far side position beyond the retaining position and then returning the work implement unit to the retaining position, and allows the work implement unit to return to the basic position through a second movement control device.

14 Claims, 9 Drawing Sheets

WORK VEHICLE WITH STROKE ADJUSTMENT MECHANISM FOR SUSPENDED WORK IMPLEMENT UNIT

TECHNICAL FILED

The present invention relates to a stroke adjustment mechanism for locking a work implement unit with a predetermined stroke position in cooperation with a raising/lowering mechanism based on operational movement of a manually-operated control device, and to a work vehicle having the stroke adjustment mechanism.

As an example of the above-noted work vehicle, a lawn mower is known from U.S. Pat. No. 6,122,903 in which a mower unit is suspended to be vertically movable through a parallel four-point link mechanism. The lawn mower includes a raising/lowering device for raising and lowering the mower unit having a raising/lowering control lever, a lever fixing member for fixing the raising/lowering control lever in a raising operation limit position and a lowering operation limit position of the mower unit, and an assisting member for providing an assisting force to raise the mower unit when the control lever is operated. The lever fixing member has a locking plate arranged adjacent to the raising/lowering control lever. The raising/lowering control lever is provided with a locking pin shiftable between a locking position and an unlocking position in response to longitudinal movement of the control lever and urged to the locking position, and an unlocking control member for operating the locking pin to the unlocking position against the urging force. The locking plate is provided with an oscillation limiting groove for receiving the locking pin located in the unlocking position to limit oscillating movement of the control lever to a range between the raising operation limit position and the lowering operation limit position, a raising limit fixing engaging recess for engaging the locking pin brought to the locking position from the oscillation limiting groove when the raising/lowering control lever is located in the raising operation limit position thereby to fix the control lever in the raising operation limit position, and a lowering limit fixing engaging recess for engaging the locking pin brought to the locking position from the oscillation limiting groove when the raising/lowering control lever is located in the lowering operation limit position thereby to fix the control lever in the lowering operation limit position. More particularly, in order to retain the mower unit in the raising operation limit position, the operator unlocks the raising/lowering control lever by using the unlocking control member, and then pulls up the raising/lowering control lever to raise the mower unit. In that state, a locking operation is performed with the unlocking control member to retain the mower unit in the raising operation limit position.

Further, a lawn mower including a raising/lowering device for achieving a link mechanism for suspending a mower unit for vertical movement through a hydraulic control system is known from U.S. Pat. No. 7,770,307. With this raising/lowering device, a raising/lowering control lever arranged in a driver's seat is linked to a control valve for controlling a flow of work oil relative to a hydraulic cylinder. The mower unit is vertically moved by operating the control valve with the raising/lowering control lever. In order to switch the mower from a simple traveling mode to an operational traveling mode, the operator raises the mower unit to an upper limit and then oscillates the control lever to bring a receiving member to a retracted position, thereby to prevent the mower unit from descending from a desired mowing level position determined by a lower limit setting device. Thus, the receiving member is switched to either of a receiving position and the retracted position along with the control lever by operating the control lever, thereby to easily change the lowering limit position to the desired mowing level position and the retracted position for travel or transportation.

In spite of alleviation of an operational burden laid on the operator, using the hydraulic control system in vertically moving the work implement unit results in increase in the manufacturing cost and maintenance cost. The object of the present invention is to provide a raising/lowering device for a work implement unit or a work vehicle equipped with such a raising/lowering device for reducing the operational burden put on the operator without using any hydraulic control system or electric control system which is likely to boost the overall cost.

In order to achieve the above-noted object, the present invention provides a work vehicle with a suspended work implement unit, comprising a raising/lowering mechanism for supporting the work implement unit for vertical movement; a manually-operated control device for vertically moving the work implement unit; and a stroke adjustment mechanism for locking the work implement unit with a predetermined stroke position in cooperation with the raising/lowering mechanism based on operational movement of the manually-operated control device. The stroke adjustment mechanism includes a rod having a longitudinal axis; a cam engaging unit mounted on the rod; and a cam member for producing relative rotation with the cam engaging unit through contact with the cam engaging unit in a cam movement rotational phase region. Further, an inclined cam portion is formed in the cam member, having a function to retain the work implement unit in a retaining position through first operational movement of the manually-operated control device for moving the work implement unit from a basic position to a far-side position beyond the retaining position and then returning the work implement unit to the retaining position, and a function to allow the work implement unit to return to the basic position through second operational movement of the manually-operated control device for moving the work implement unit from the retaining position to the far-side position and then returning the work implement unit to the retaining position.

With the above-noted stroke adjustment mechanism, the operator may operate the work implement unit to the basic position or to the retaining position through the operational movement produced by simple operation of the manually-operated control device.

The stroke adjustment mechanism according to the present invention is characterized by:

(1) A cam engaging unit is mounted on a rod having a longitudinal axis. The cam engaging unit includes (1-1) a first cam engaging member transversely projecting from the rod, and (1-2) a second cam engaging member spaced from the first cam engaging member along the longitudinal axis and transversely projecting from the rod in a rotational phase different from that of the first cam engaging member.

(2) A cam member is provided to be rotatable about the longitudinal axis relative to the cam engaging unit. The cam member has (2-1) a passage portion for allowing passage of the second cam engaging member in a passage rotational phase, (2-2) a first inclined cam surface for producing relative rotation with the cam engaging unit through contact with the first cam engaging member in a first cam movement rotational phase region, (2-3) a second inclined cam surface for producing relative rotation with the cam engaging unit through contact with the second cam engaging member in a second cam movement rotational phase region, and (2-4) a retaining portion for retaining the rod in the direction of the longitudinal axis in a retaining rotational phase.

The above-noted characteristic arrangement selectively produces a releasing state in which the rod or the cam member makes stroke movement freely in the longitudinal direction by cam action between the cam engaging unit and the cam member, and a locking (retaining) state in which the stroke movement is prohibited, only by providing simple operational movement to the rod or the cam member.

In a preferred embodiment, the cam member is formed as a tubular member (ring member) fitted on the rod, and the passage portion is formed as a through opening for allowing passage of the second cam engaging member. Further, when those parts are covered by the cylinder housing, the stroke adjustment mechanism provides an appearance similar to that of a damper or a fluid-pressure cylinder, which facilitates attachment to a target object.

When the passage portion is formed as a through opening for allowing passage of the second cam engaging member, and this through opening has a shape adapted to an outer contour of the second cam engaging unit to guide stroke movement of the second cam engaging unit, the stroke movement of the second cam engaging member is stabilized free from deviation.

The work vehicle employing the above-noted stroke adjustment mechanism is preferably applied to a lawn mower including a mower unit acting as the work implement unit that is suspended from a vehicle body between front wheels and rear wheels, and a pedal acting as the manually-operated control device that is operated with a driver's foot.

DESCRIPTION OF EMBODIMENTS

Prior to describing a specific embodiment of a work vehicle including a stroke adjustment mechanism according to the present invention, a fundamental principle of the stroke adjustment mechanism will be described in reference to FIGS. 1 and 2.

When a work implement unit is suspended from a vehicle body using a raising/lowering mechanism, for example, the stroke adjustment mechanism 100 functions to retain or lock the work implement unit in a predetermined stroke position in cooperation with the raising/lowering mechanism based on operational movement of a manually-operated control device for executing the raising/lowering operation. The stroke adjustment mechanism 100 shown in FIG. 1 includes a rod 8 projectable and retractable from a cylinder housing 8A that is only schematically shown here, and a cam member 9 accommodated in the cylinder housing 8A. Thus, the cylinder housing 8A or the rod 8 is connected to the vehicle body on one hand, and is connected to the work implement unit directly or through the raising/lowering mechanism on the other hand.

Figure 1:
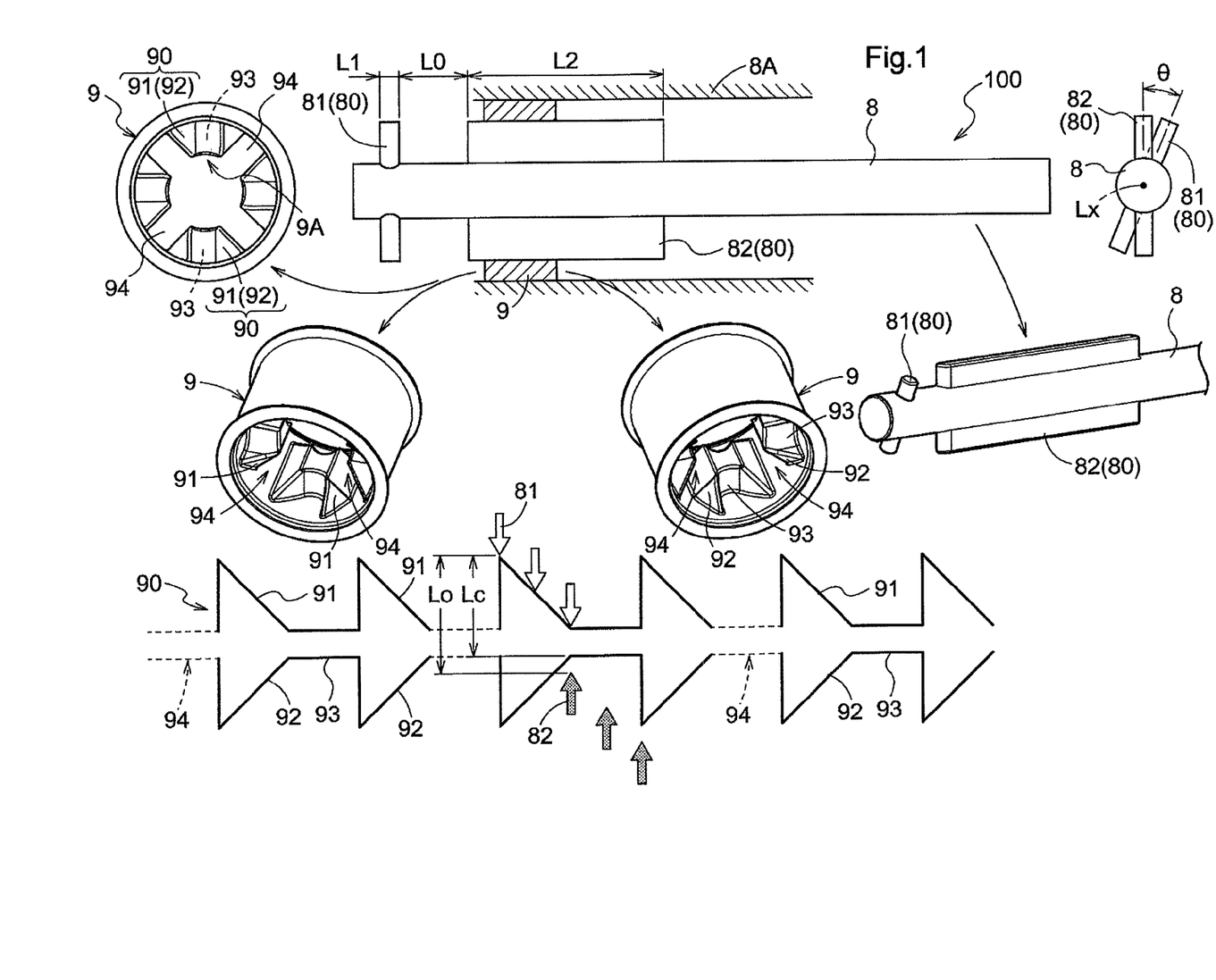
FIG. 1 is a schematic view describing a fundamental principle of a stroke adjustment mechanism according to the present invention.

As understood from FIG. 1, the rod 8, cylinder housing 8A and cam member 9 share a single longitudinal axis LX. The cam member 9 is attached to the cylinder housing 8A to be unmovable relative to the cylinder housing 8A in the direction of the longitudinal axis LX (referred to simply as "in the axial direction" hereinafter) and to be rotatable about the longitudinal axis LX (referred to simply as "about the axis" hereinafter). The cam member 9 is a ring member having a central bore 9a formed in a central portion thereof for receiving the rod 8 and having an inclined cam portion 9A with an inclined cam surface 90 formed in the ring portion. The rod 8 has a cam engaging unit 80 acting on the inclined cam portion 9A of the cam member 9. The inclined cam portion 9A produces predetermined relative rotation between the inclined cam surface 90 and the cam engaging unit 80 by coming into contact with the cam engaging unit 80 in a cam movement rotational phase region. More particularly, the interactions between the inclined cam portion 9A and the cam engaging unit 80 achieve (1) a function to retain the work implement unit in a retaining position through first operational movement of the manually-operated control device for moving the work implement unit from a basic position to a far-side position beyond the retaining position and then returning the work implement unit to the retaining position, and (2) a function to allow the work implement unit to return to the basic position through second operational movement of the manually-operated control device for moving the work implement unit from the retaining position to the far-side position and then returning the work implement unit to the retaining position.

In the example shown in FIG. 1, the cam engaging member 80 includes a first cam engaging member 81 and a second cam engaging member 82, each of which has two wings radially project from the rod 8 in a rotationally symmetric manner relative to the longitudinal axis LX. The first cam engaging member 81 and the second cam engaging member 82 are arranged with a phase difference (difference of mounting centers) θ about the axis and with a distance L0 in the axial direction. The first cam engaging member 81 and the second cam engaging member 82 have different lengths, that is, a length L1 of the first cam engaging member 81 is far smaller than a length L2 of the cam engaging member 82. Radial sections of the first cam engaging member 81 and the second cam engaging member 82 are substantially the same.

The inclined cam portion 9A of the cam member 9 has a passage portion 94 for allowing passage of at least part of the cam engaging unit 80 in a passage rotational phase, the inclined cam surface 90 for producing relative rotation with the cam engaging unit 80 by coming into contact with the cam engaging unit 80 in the cam movement rotational phase region, and a retaining surface 93 acting as a retaining portion for retaining or locking the rod in a retaining rotational phase. The passage portion 94 is a through groove forming an angle of 90 degrees with the adjacent passage portion 94 in the example shown in FIG. 1. A radial section of the passage portion 94 is larger than a radial section of the cam engaging unit 80, that is, a radial section of each of the wings of the first cam engaging member 81 and the wings of the second cam engaging member 82, to allow the cam engaging unit 80 to enter or extend through the passage portion 94 in a specific relative rotational phase.

As understood from a circumferential development about the axis of the inclined cam portion 9A schematically shown in FIG. 1, the inclined cam portion 9A is provided in each side of the cam member 9. While units each consisting of the passage portion 94 and first inclined cam surface 91 are distributed at predetermined angular intervals (90 (22.5+45+22.5+22.5) degrees in the drawings) on one side, units each consisting of the passage portion 94, second inclined cam surface 92 and retaining surface (retaining portion) 93 are distributed at the above-noted angular intervals (90 (22.5+22.5+22.5+22.5) degrees in the drawings) on the other side, to allow the units of the opposite sides to face each other. The angular interval may vary such as 120 degrees or 45 degrees, for example, depending on specifications. It should be noted that the retaining surface (retaining portion) 93 formed between the adjacent first inclined cam surfaces 91 is a simple transitional portion which does not act as a retainer actually, but referred to as the retaining portion 93 for convenience' sake.

Although described in detail later, in a specific phase relationship between the cam engaging unit 80 and the inclined cam surface 90, the first inclined cam surface 91 interacts with the first cam engaging member 81 and produces relative rotation, while the second inclined cam surface 92 interacts with the second cam engaging member 82 and produces relative rotation. Further, in another specific phase relationship, the cam engaging unit 80 is allowed to pass through the passage portion 94. Thus, when the inclined cam surface 91 or 92, passage portion 94 and retaining portion 93 are arranged at angular intervals of 22.5 degrees as shown in FIG. 1, the passage portions 94 are arranged at angular intervals of 90 degrees. Therefore, the phase difference θ between the first cam engaging member 81 and the second cam engaging member 82 is determined as 22.5 degrees.

With the above-noted arrangement, as the first inclined cam surface 91 interacts with the first cam engaging member 81 camwise, or as the second inclined cam surface 92 interacts with the second cam engaging member 82 camwise, the cam member 9 is rotated by a unit of 22.5 degrees. Repetition of such rotation produces a phase state in which the rod 8 passes through the cam member 9, and a phase state in which the rod 8 is retained or locked by the cam member 9.

As understood from the schematic view of the development of the inclined cam portion, it should be noted that a distance LC between an effective engaging region where the first inclined cam surface 91 engages with the first cam engaging member 81 and an effective engaging region where the second inclined cam surface 92 engages with the second cam engaging member 82 in the inclined cam surface 90 is smaller than the distance L0 between the first cam engaging member 81 and the second cam engaging member 82 to avoid synchronous cam actions between the first inclined cam surface 91 and the first cam engaging member 81 and between the second inclined cam surface 92 and the second cam engaging member 82. Further, the inclined cam surface 90 is formed to allow the cam member 9 to engage with at least either one of the first cam engaging member 81 and the second can drive member 82 so as not to be disengaged from both of them for natural rotation. For this reason, an overall length LA of the cam member 9 is set to be greater than the distance L0 noted above. However, when the cam member 9 is formed so as not to make natural rotation by applying a proper rotational frictional force to the cam member 9, the overall length LA of the cam member 9 or the distance LC may be smaller than the distance L0.

Next, the fundamental movement of the stroke adjustment mechanism 100 formed as shown in FIG. 1 will be described in stages hereinafter in reference to FIG. 2.

Figure 2A:
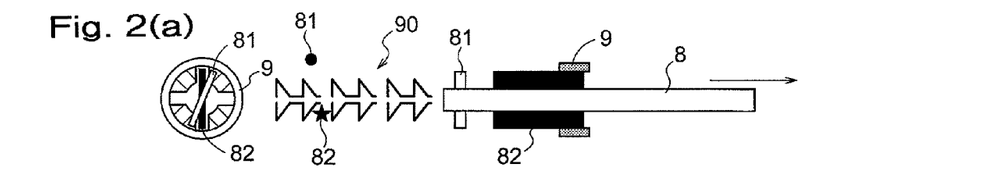
FIGS. 2(a)-2(f) are schematic views illustrating fundamental movement of the stroke adjustment mechanism according to the present invention.

FIG. 2(a) shows a state in which the rod 8 is retracted to the basic position, and each wing of the second cam engaging member 82 enters the passage portion 94. In this state, the rod 8 is extendable.

Figure 2B:
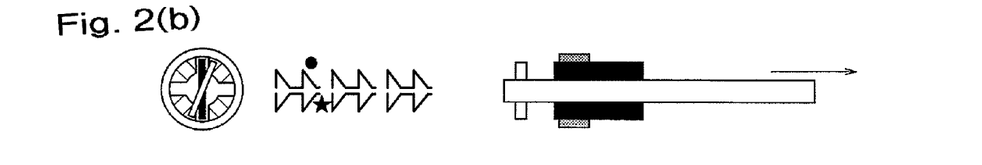

FIG. 2(b) shows a state in which the rod 8 is extended to allow each wing of the second cam engaging member 82 to be guided by the passage portion 94, with the rod 8 being extended.

Figure 2C:
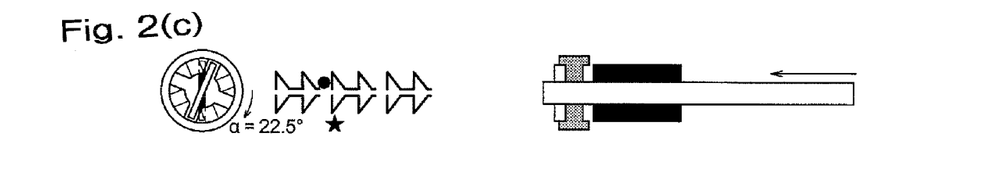

FIG. 2(c) shows a state providing a phase in which each wing of the second cam engaging member 82 is disengaged from the passage portion 94, each wing of the first cam engaging member 81 is engaged with the first inclined cam surface 91, the cam member 9 is rotated by a predetermined angle α (22.5 degrees in this example) due to the cam action between the first cam engaging member 81 and the first inclined cam surface 91, and each wing of the second cam engaging member 82 is engageable with the second inclined can surface 92.

Figure 2D:
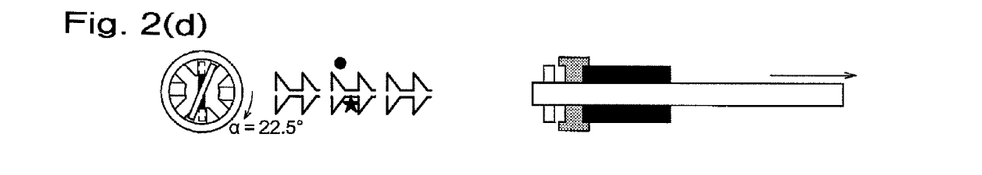

FIG. 2(d) shows a state in which the rod 8 is slightly returned from the state of FIG. 2(c), thereby to allow each wing of the second cam engaging member 82 to engage with the second inclined cam surface 92, allow the cam member 9 to rotate by the predetermined angle α (22.5 degrees in this example) due to the cam action between the second cam engaging member 82 and the second inclined cam surface 92, establish a phase in which each wing of the second cam engaging member 82 is engageable with the retaining portion 93, and allow each wing of the second cam engaging member 82 to be received by the retaining portion 93 (locking state).

Figure 2E:
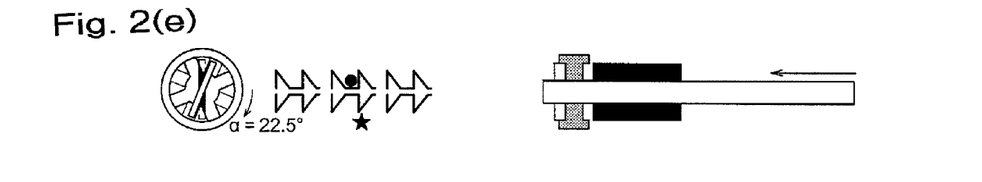

FIG. 2(e) shows a state in which the rod 8 is extended again, thereby to allow each wing of the first cam engaging member 81 to engage with the next first inclined cam surface 91 and allow the cam member 9 to rotate by the predetermined angle α (22.5 degrees in this example) due to the cam action between the first cam engaging member 81 and the first inclined cam surface 91.

Figure 2F:
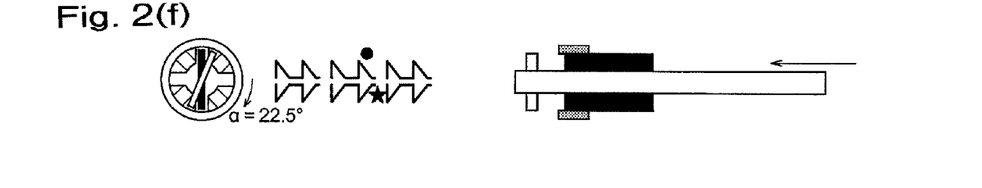

FIG. 2(f) shows a state in which the rod is retracted from the state of FIG. 2(e), thereby to allow each wing of the second cam engaging member 82 to engage with the second inclined cam surface 92, allow the cam member 9 to rotate by the predetermined angle α (22.5 degrees in this example) due to the cam action between the second cam engaging member 82 and the second inclined cam surface 92, and establish a phase in which each wing of the second cam engaging member 82 enters the passage portion 94. As a result, the rod 8 may be retracted to the basic position shown in FIG. 2(a).

Figure 3:
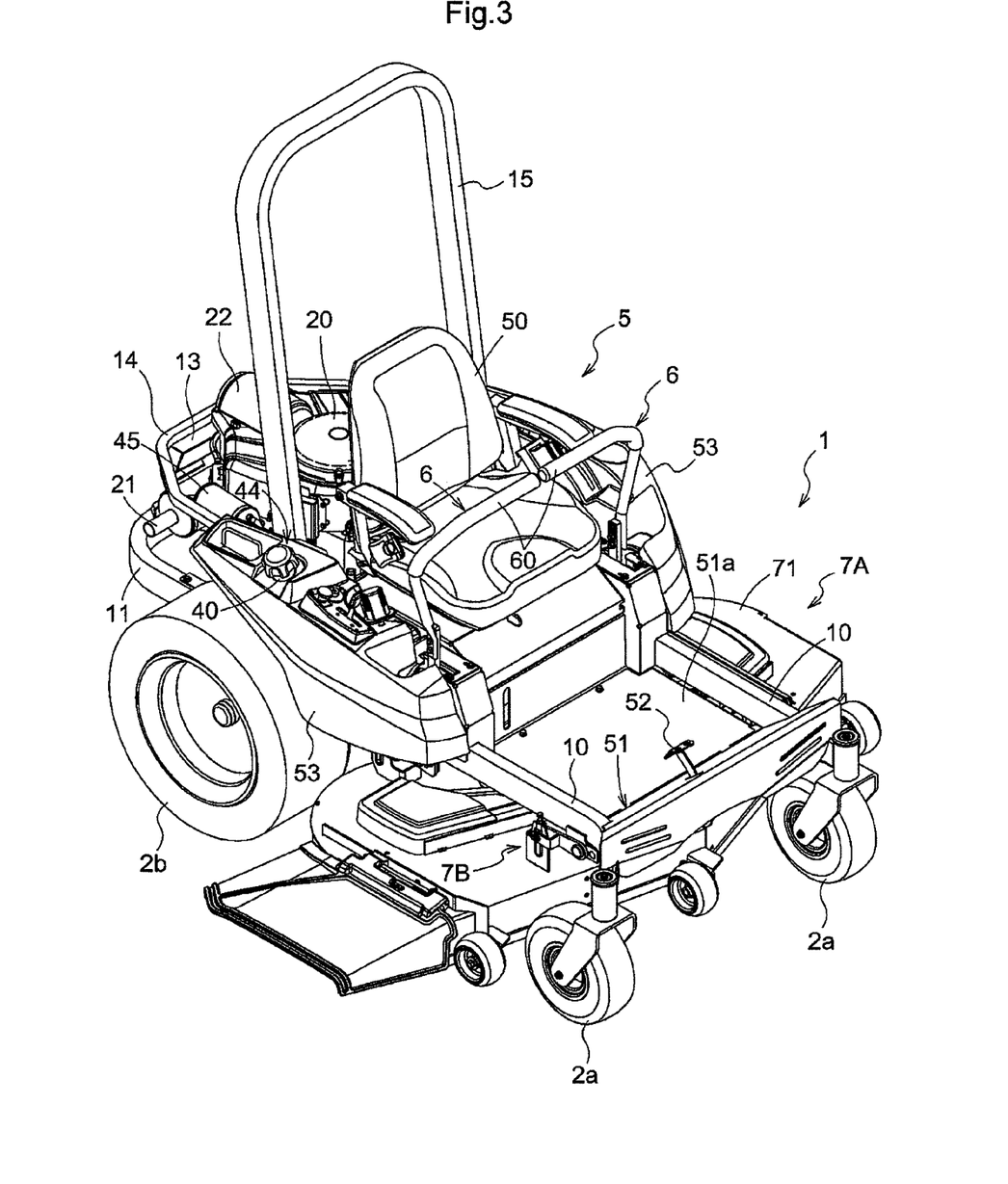
FIG. 3 is an overall view of a zero-radius-turning mower exemplifying a work vehicle provided with the stroke adjustment mechanism according to the present invention.

The specific embodiment of the present invention will be described hereinafter in reference to the accompanying drawings. Here, a work vehicle according to the present invention is represented by a ride-on lawn mower including a vehicle body 1 supported to a right and left pair of front wheels 2a and a right and left pair of rear wheels 2b, as shown in FIG. 3. This type of ride-on lawn mower is also termed as a zero-radius-turning mower, in which the right and left rear wheels 2b are independently controlled in forward/reverse drive speed.

The vehicle body 1 includes a front frame 10 and a rear frame 11 made of square pipe material, for example, as main components. Although described in more detail later, a mower unit 7B is suspended from the front frame 10 between the right and left pair of front wheels 2a and the right and left pair of rear wheels 2b to be vertically movable through a raising/lowering mechanism 7A. The raising/lowering mechanism 7A functions to vertically move the mower unit 7B in a horizontal position through pedal control or lever control.

A boarding platform 51 made of sheet metal is provided to substantially cover the entire front frame 10 from above. A rubber mat 51a is laid over a surface of the boarding platform 51, and an elevation control pedal 52 is arranged in a central forward portion of the boarding platform 51 for vertically moving the mower unit 7B through the raising/lowering mechanism 7A. A driver's seat 50 is positioned one level higher rearwardly of the boarding platform 51. Fenders 53 and handle units 6 having shift levers 60 are provided in lateral opposite sides of the driver's seat 50, respectively. Various shift levers and control buttons are arranged on a top surface of each fender 53. A gate-shaped ROPS frame 15 vertically extends rearwardly of the driver's seat 50. The ROPS frame 15 is made of square pipe material. In this type of ride-on lawn mower, a front area forwardly of the ROPS frame 15 of the vehicle body 1 is defined as a driver's section 5, while a rear area rearwardly of the ROPS frame 15 of the vehicle body 1 is defined as a power source section including a gasoline engine 20.

The rear frame 11 has an arched shape as viewed from the top with a right and left pair of straight frame portions extending longitudinally in the vicinity of the rear wheels 2b and a curved frame portion projecting rearward for connecting the right and left straight frame portions to each other. A substantially horizontal mounting deck 12 for receiving various devices constituting the power source section including the engine 20 is provided rearwardly of the driver's seat 50, which is formed as a top surface of a floor material mounted on the rear frame 11 in the current embodiment. Further, vertical frames 13 extend from an upper portion of the rear frame 11 to be spaced from each other by a predetermined interval. An outer pipe frame 14 having a similar shape to the contour of the rear frame 11 is attached to upper portions of the vertical frames 13.

The engine 20 is mounted in the central part of the mounting deck 12 with an output shaft thereof projecting downward. A fuel tank 40 is mounted over a region from a front area to a right-side area of the engine 20. The fuel tank 40 consists of a main tank body mounted under the driver's seat 50 forwardly of the engine 20, and an auxiliary tank body extending vertically on the right side of the engine 20 rearwardly of the driver's seat 50. In FIG. 3, only an oil-feeding unit 44 attached to a top portion of the auxiliary tank body is explicitly shown. The main tank body has a flat top surface and thus can be arranged efficiently along a lower surface of the driver's seat 50. The auxiliary tank body has a rectangular section elongated transversely of the vehicle body as viewed from the top and extends higher than the main tank body with the top portion thereof positioned at a level beyond the outer pipe frame 14.

A canister 45 is placed adjacent to a rear side of the auxiliary tank body of the fuel tank 40. The canister 45 is connected to an air intake system of the engine 20 through an unillustrated purge conduit (hose), and is connected to the fuel tank 40 through an unillustrated fuel gas conduit (hose). Further, a muffler 21 is placed on a rearmost portion of the mounting deck 12. An air cleaner 22 is mounted in a position higher than the engine 20. An engine cooling fan is provided above the engine 20 to be rotatable in unison with the output shaft of the engine 20, which is hidden in the drawings by an air-introducing housing of the engine 20 in the drawings.

Figure 4:
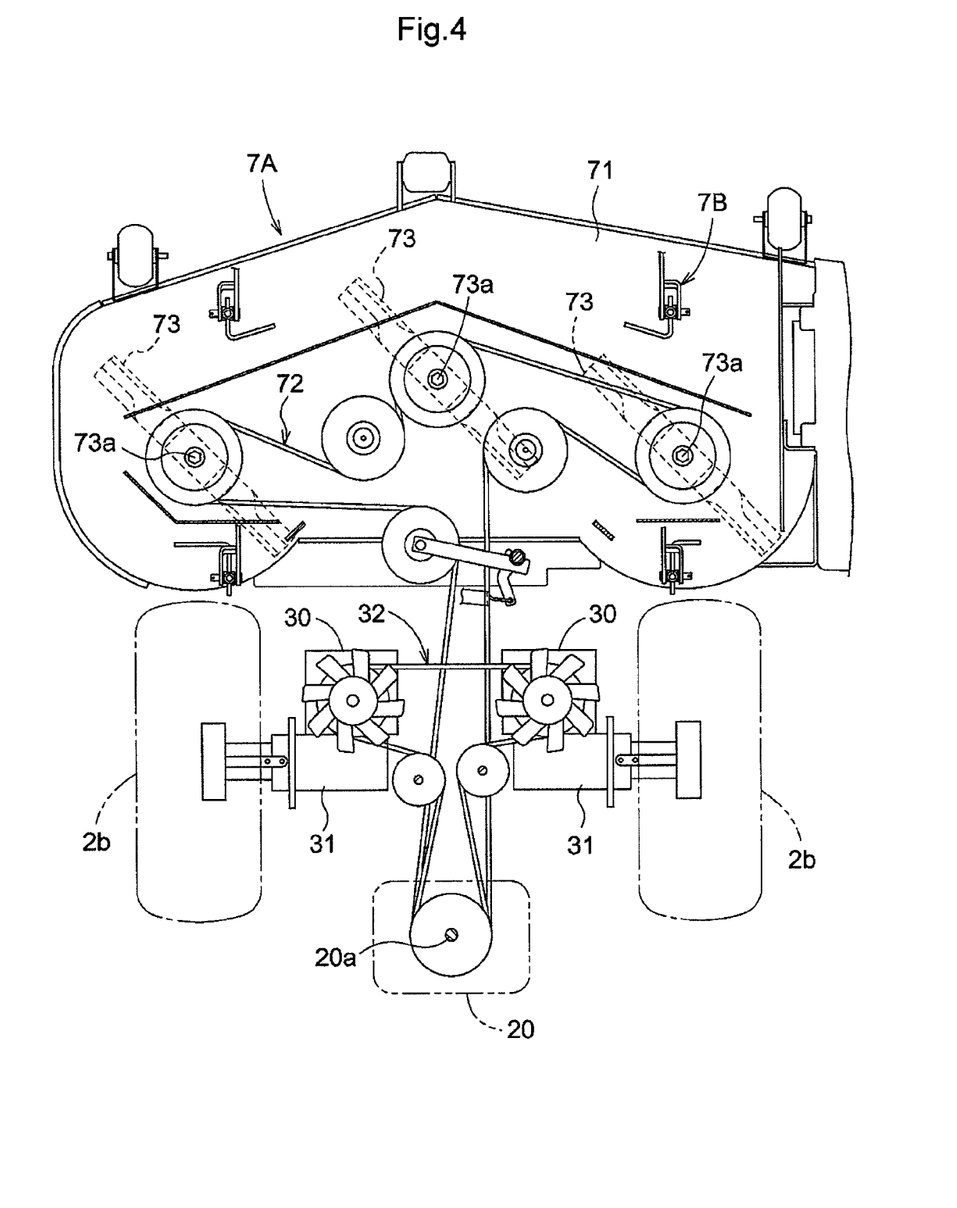
FIG. 4 is a power transmission line of the zero-radius-turning mower.
Figure 5:
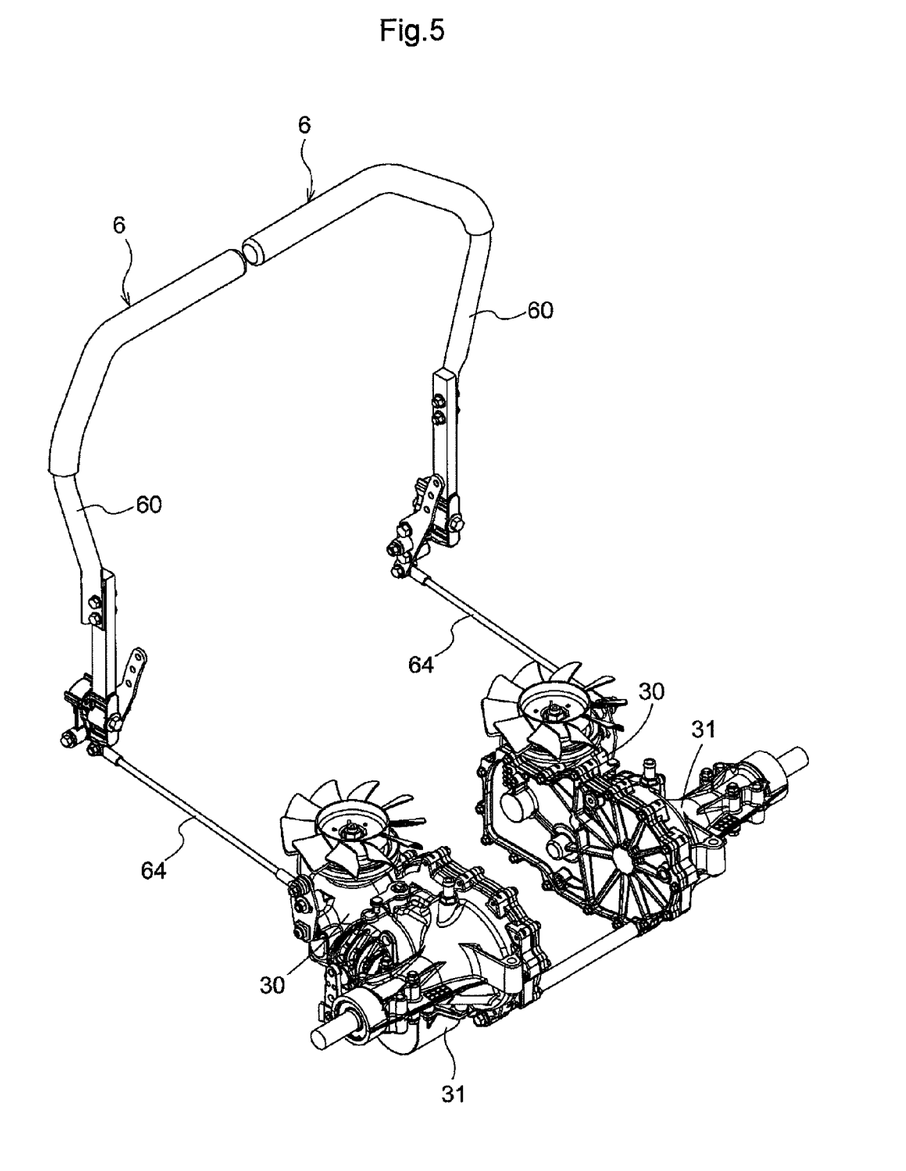
FIG. 5 is a perspective view showing the relationship between a handle unit and a change speed device.
Figure 6:
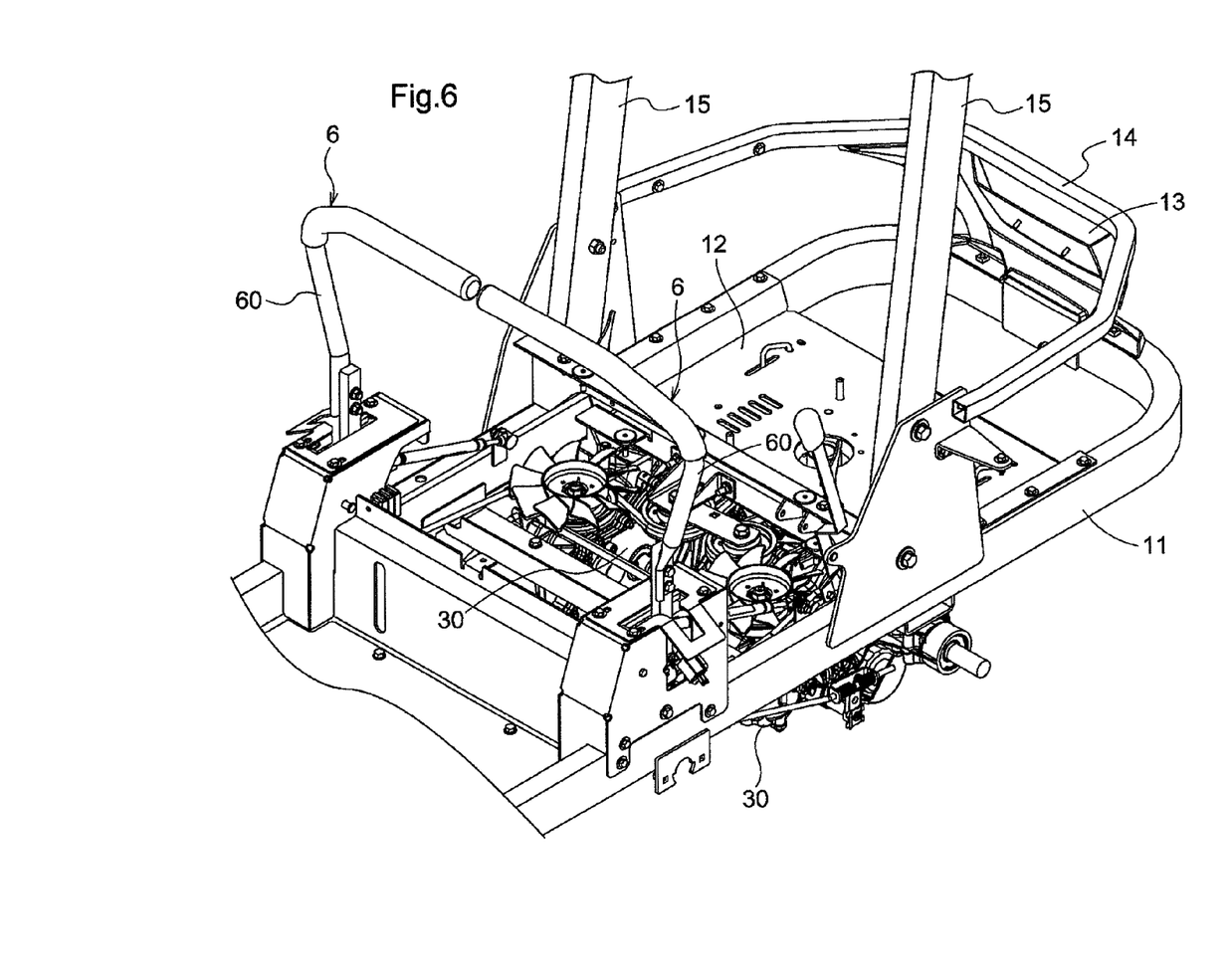
FIG. 6 is a perspective view showing the handle unit assembled to a vehicle body.

In association with each of the right and left rear wheels 2b, an HST (hydrostatic transmission) 30 and a gear transmission mechanism 31 for transmitting drive power to the rear wheel 2b are provided as schematically shown in FIGS. 4 to 6. A propelling-line belt transmission mechanism 32 includes pulleys mounted in the output shaft 20a of the engine 20 and the respective HSTs 30 so that output from the engine is transmitted to each HST. A shift control shaft for each HST (not shown) is linked to an associated shift lever 60 of the handle unit 6 through a control link mechanism 64 so that shifting operation is performed in response to longitudinal oscillating movement of each of the shift levers 60 mounted directly forwardly and laterally of the driver's seat 50.

With the above arrangement, either of the right and left shift levers 60 is oscillated longitudinally to shift the HST 30 associated with the oscillated shift lever 60, which allows the right and left rear wheels 2b to be independently speed changed. More particularly, in this type of ride-on lawn mower, the right and left front wheels 2a are followably steered while the right and left rear wheels 2b are independently driven for speed change, thereby to desirably produce a stop state for stopping the right and left rear wheels 2b, a straight-forward traveling state for driving the right and left rear wheels 2b forwardly or reversely at the same speed, a gentle-turn state for driving the right and left wheels 2b forwardly or reversely at different speeds, a pivot-turn state for stopping one of the right and left rear wheels 2b while driving the other of them forwardly or reversely, and a spin-turn state for driving one of the right and left rear wheels 2b forwardly while driving the other of them reversely.

As understood from FIG. 4, the mower unit 7B is suspended from the front frame 10 between the right and left pair of front wheels 2a and the right and left pair of rear wheels 2b to be vertically movable through the raising/lowering mechanism 7A. The mower unit 7B includes three cutting blades 73 arranged in the transverse direction of the vehicle body within a mower deck 71. Each of the cutting blades 73 is fixed to a drive shaft 73a supported to the mower deck 71. A mower-unit belt transmission mechanism 72 is provided to include pulleys mounted on the output shaft 20a of the engine 20 and each drive shaft 73a, in which output from the engine 20 is transmitted to the mower unit 7B. The propelling-line belt transmission mechanism 32 and the mower-unit belt transmission mechanism 72 use the output shaft 20a of the engine 20 as an input shaft, and arranged at different levels independently of each other planarly. This arrangement allows constant-speed drive power to be transmitted to the mower unit 7B regardless of a traveling speed or traveling state.

Next, the relationship between the raising/lowering mechanism 7A for suspending the mower unit 7B from the front frame 10 for vertical movement and a stroke adjustment mechanism 100 used for retaining the mower unit 7B in an upper limit position will be described in reference to FIGS. 7, 8, 9A, 9B.

Figure 7:
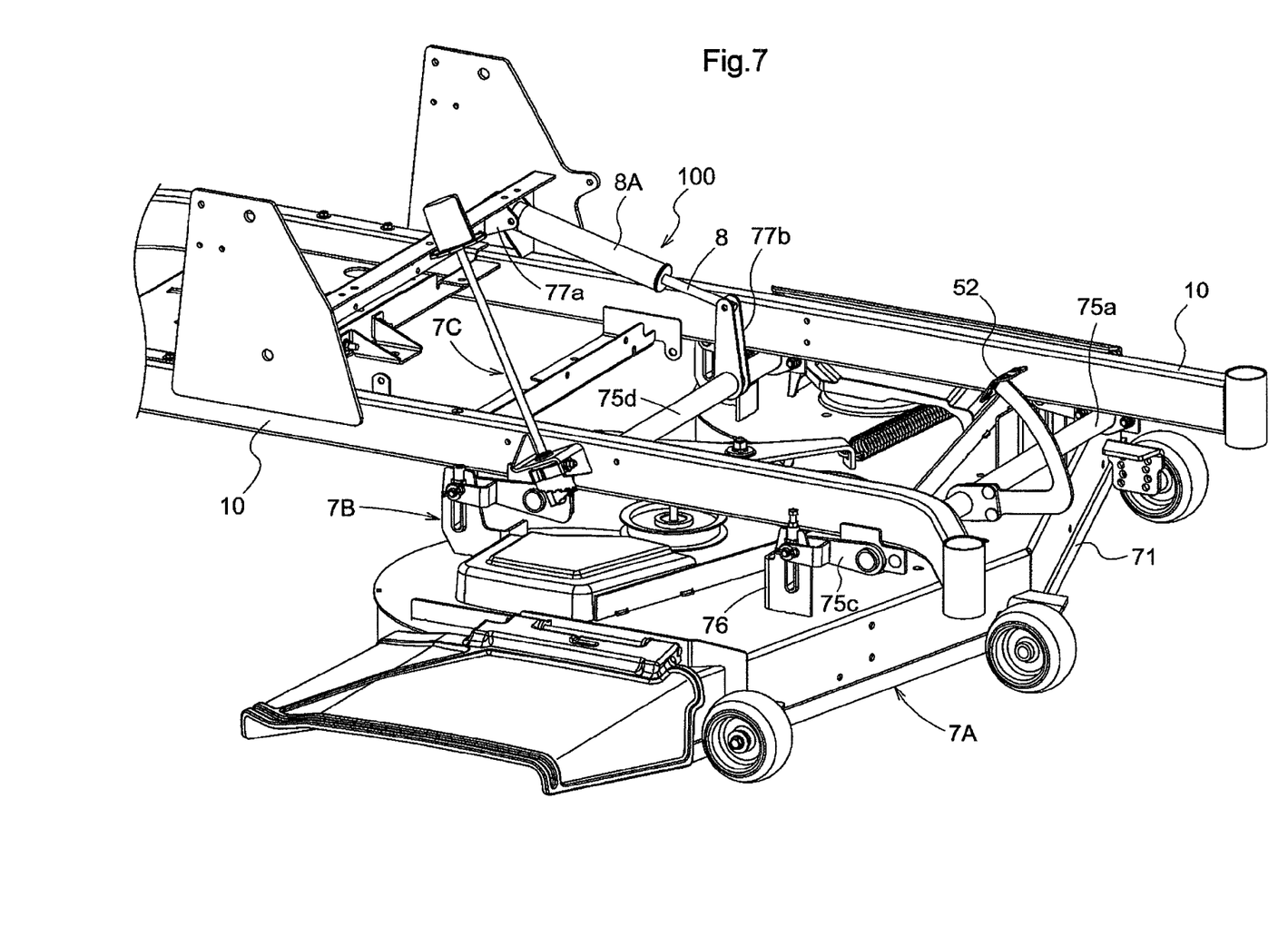
FIG. 7 is a perspective view showing a suspending mechanism for a mower unit.
Figure 8:
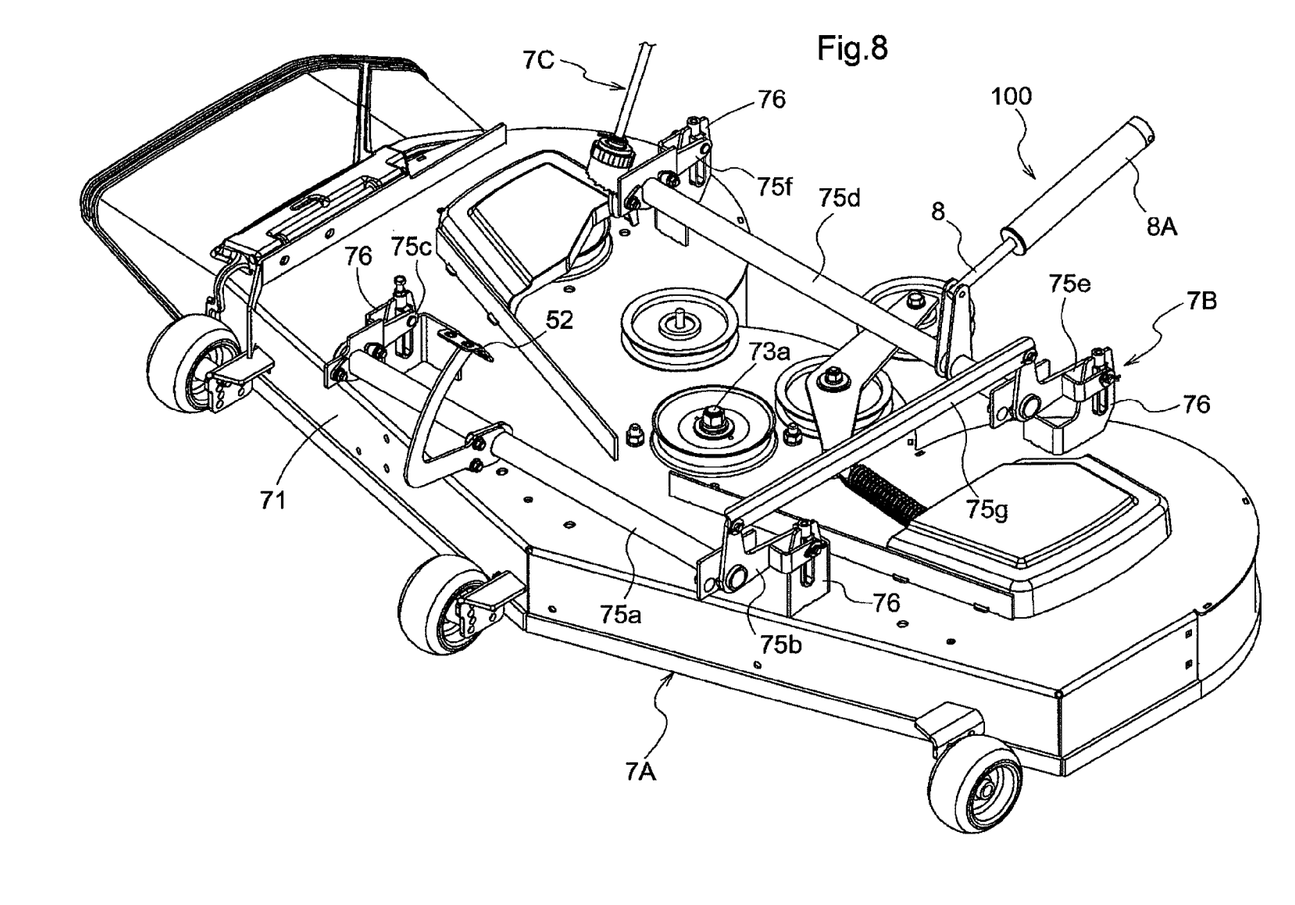
FIG. 8 is a perspective view showing the mower unit, stroke adjustment mechanism, and a raising/lowering mechanism.

The raising/lowering mechanism 7A is a link type and includes a first pivotal shaft 75a extending in a forward region of the mower unit 7B, a first swing arm 75b and a second swing arm 75c connected to opposite ends of the first pivotal shaft 75a, a second pivotal shaft 75d extending in a rearward region of the mower unit 7B, a third swing arm 75e and a fourth swing arm 75f connected to opposite ends of the second pivotal shaft 75b, and a connecting bar 75g for connecting the first swing arm 75b to the third swing arm 75e.

The first pivotal shaft 75a and the second pivotal shaft 75d are pivotally supported to the front frame 10. The first swing arm 75b has arm portions extending in two directions from a connection point to the first pivotal shaft 75a. While one of the arm portions is connected to the mower deck 71 through a bracket 76, the other of the arm portions is connected to one end of the connecting bar 75g. The third swing arm 75e has substantially the same shape as the first swing arm 75b and also has two arm portions. While one of the arm portions of the third swing arm 75e is connected to the mower deck 71 through a bracket 76, the other of the arm portions is connected to the other end of the connecting bar 75g. Each of the second swing arm 75c and the fourth swing arm 75f is formed as a single link arm. The second swing arm 75c is connected to the first pivotal shaft 75a at one end thereof and connected to the mower deck 71 at the other end thereof through a bracket 76. Similarly, the fourth swing arm 75f is connected to the second pivotal shaft 75d at one end thereof and connected to the mower deck 71 at the other end thereof through a bracket 76. The four brackets 76 are arranged upright at positions in a top plate of the mower deck 71 to suspend and support the mower deck 71 in a balanced way. The elevation control pedal 52 is connected to the first pivotal shaft 75a to be depressed to pivotally move the first pivotal shaft 75a.

With the above-noted arrangement of the raising/lowering mechanism 7A, when the operator depresses the elevation control pedal 52, the first pivotal shaft 75a is pivoted, and then the first swing arm 75b and second swing arm 75c are pivotally moved. Further, the second pivotal shaft 75d is also pivoted through the connecting bar 75g to allow the third swing arm 75e and fourth swing arm 75f to pivotally move as well, as a result of which the mower deck 71, that is, the mower unit 7B is raised.

In order to maintain the mower unit 7B raised by the depressing operation of the elevation control pedal 52 in the predetermined basic position, the stroke adjustment mechanism 100 whose fundamental arrangement was described above in reference to FIGS. 1 and 2 is used. The stroke adjustment mechanism 100 includes a cylinder housing 8A, and a rod 8 projecting from the cylinder housing 8A in appearance. The cylinder housing 8A has a rear end portion pivotably connected to a cross bar forming the front frame 10 through a cylinder mounting bracket 77a. The rod 8 has a forward end portion pivotably connected to a distal end of a rod mounting arm 77b fixed to the second pivotal shaft 75d. Therefore, in association with the vertical movement of the mower unit 7B caused by the depressing operation of the elevation control pedal 52, the rod 8 is projected from or retracted into the cylinder housing 8A.

Figure 9A:
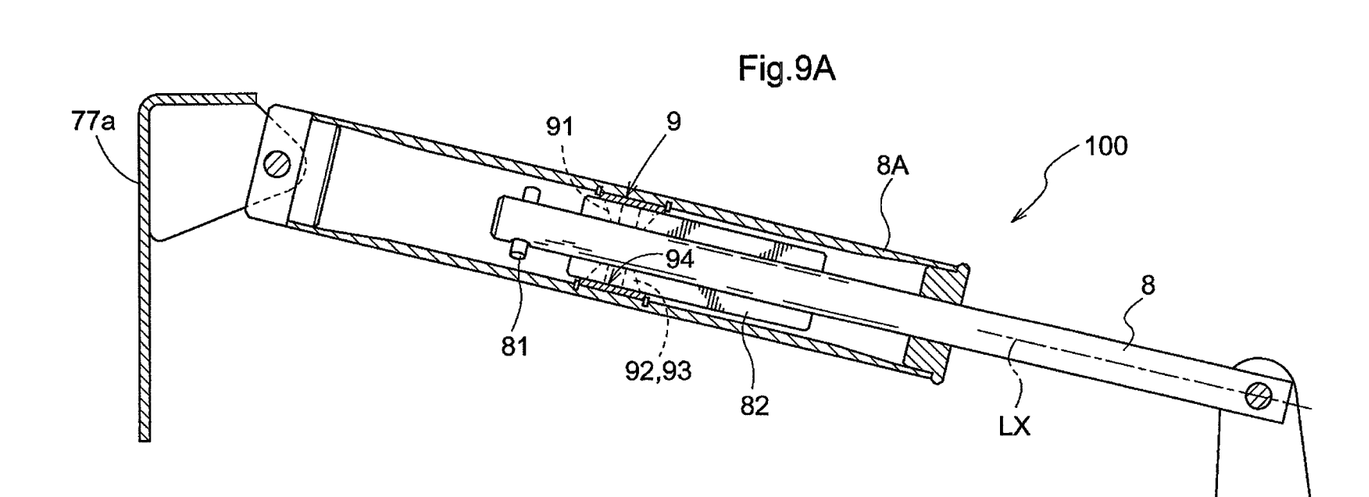
FIG. 9A is a schematic view showing the stroke adjustment mechanism.
Figure 9B:
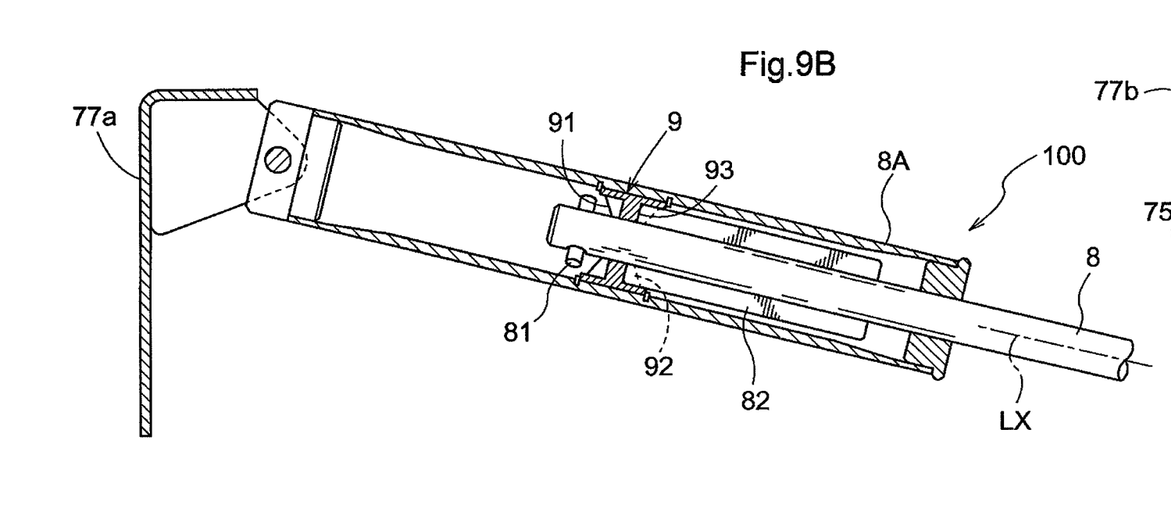
FIG. 9B is a schematic view showing the stroke adjustment mechanism.

As understood from FIGS. 9A, 9B, a cam member 9 is accommodated in a cylinder housing 8A to be rotatable about the axis and unmovable in the axial direction. A rod 8 includes a first cam engaging member 81 and a second cam engaging member 82 axially spaced from the first cam engaging member 81. As shown in FIG. 1, the cam member 9 is formed as a ring member surrounding the rod 8. In an upper end region of the cam member 9 are circumferentially formed a passage portion 94, first inclined cam surface 91 and retaining portion 93 at predetermined angular intervals. Similarly, in a lower end region of the cam member 9 are circumferentially formed the passage portion 94, second inclined cam surface 92 and retaining portion 93 at predetermined angular intervals. FIG. 9A shows the stroke adjustment mechanism 100 positioned in the state of FIG. 2(b).

When the mower unit 7B is raised to a sufficient level from the ground by the depression of the elevation control pedal 52, the rod 8 is extended from the cylinder housing 8A in which a rotational phase of the cam member 9 is brought to a second cam movement rotational phase region, thereby to establish a phase relationship in which the second cam engaging member 82 is engageable with the second inclined cam surface 92. Then, when the elevation control pedal 52 is released, the mower unit 7B is slightly lowered by gravity to bring the second cam engaging member 82 into contact with the second inclined cam surface 92. As a result, the rotational phase of the cam member 9 represents a retaining rotational phase in which an end portion of the second cam engaging member 82 is received by the retaining portion 93 (reference stroke position of the rod 8). This prevents the mower unit 7B from being lowered any further. The level of the mower unit 7B from the ground in this state is suitable for normal traveling of the mower and represents a storage position for the mower unit 7B.

The elevation control pedal 52 is depressed slightly again in the storage position for the mower unit 7B. Since the retaining rotational phase of the cam member 9 also represents a first cam movement rotational phase, the first cam engaging member 81 comes into contact with the first inclined cam surface 91 by the slight depression of the elevation control pedal 52, which allows the rotational phase of the cam member 9 to deviate from the retaining rotational phase. Then, the elevation control pedal 52 is released to bring the second cam engaging member 82 into contact with the second inclined cam surface 92 to rotate the cam member 9. In this, the rotational phase of the cam member 9 is brought to a passage rotational phase to allow the second cam engaging member 82 to pass through the passage portion 94. As a result, the mower unit 7B is lowered toward the ground by gravity.

A lower limit setting mechanism 7C is provided to restrict an amount of descent of the mower unit 7B by gravity and provide a desired mowing level. The lower limit setting mechanism 7C includes a plurality of contacting surfaces arranged at different levels, and a contacting member for coming into contact with one of the contacting surfaces selected by a selecting member. Since the lower limit setting mechanism 7C is well known, any further description is omitted here. For better understanding, reference should be made to U.S. Pat. No. 6,122,903 or U.S. Pat. No. 7,770,370 noted above.

With the above-noted coordinated action among the elevation control pedal 52, raising/lowering mechanism 7A, stroke adjustment mechanism 100 and lower limit setting mechanism 7C, the operator depresses the elevation control pedal 52 strongly and then releases the pedal slightly to allow the mower unit 7B to be stored directly under the front frame 10. In order to lower the mower unit 7B to the mowing level determined by the lower limit setting mechanism 7C, the operator should depress the elevation control pedal 52 slightly and then release the pedal to allow the mower unit 7B to descend by gravity. A damper or spring is used for achieving slow descent of the mower unit 7B by gravity.

Modified Embodiments (1) In the first embodiment, the cylinder housing 8A is formed as a fixed member, while the rod 8 is formed as a movable member. Inversely, the cylinder housing 8A may be formed as the movable member, while the rod 8 may be the fixed member.

(2) In the first embodiment, the cam member 9 is rotatable about the axis and unmovable in the axial direction. Instead, the cam member 9 may be unrotatable about the axis and the cam engaging unit 80, that is, the rod 8, may be rotatable about the axis. The point is that relative rotation caused by cam action is achieved between the cam member 9 and the cam engaging unit 80 (rod 8).

(3) In the first embodiment, the rod 8 and the cam engaging unit 80 are movable in unison or formed integrally with each other. Instead, the rod 8 and the cam engaging unit 80 may be relatively rotatable. For example, the cam engaging unit 80 may be rotatable about the rod 8 and unmovable on the rod 8 in the axial direction with opposite ends thereof being fixed by retainer rings, for example. When the cam engaging unit 80 is moved in the axial direction by cam action with the cam member 9, the rod 8 follows the movement of the cam engaging unit 80 to adjust the stroke of the rod 8.

(4) In the first embodiment, the second cam engaging member 82 achieves the guiding function for the second cam engaging member 82 or the rod 8 in the stroke movement in cooperation with the passage portion 94 formed as the through opening and has the axial length corresponding to the stroke. Instead, the second cam engaging member 82 may be formed as a pin-like member having a smaller length in a similar manner to the first cam engaging member 81 if the second cam engaging member 82 or the rod 8 is disengaged from the inclined cam surface 90 and is not rotated about the longitudinal axis LX and/or if the guiding function noted above is not required.

(5) When the mower unit 7B is vertically moved using the operational movement of the manually-operated control device such as the elevation control pedal 52 or elevation control lever, a fluid-pressure damper or spring is used for reducing an operation force. It is preferable to have such a fluid-pressure damper or spring built-in within the cylinder housing 8A of the stroke adjustment mechanism 100 since the space is effectively used.

(6) In the first embodiment, the present invention is applied to a mid-mount lawn mower, particularly to a zero-radius-turning mower. Instead, the present invention is also applicable to a front-mount lawn mower or work vehicles other than the lawn mower. The stroke adjustment mechanism 100 per se is applicable to various devices requiring what is called "one push" stroke adjustment.

What is claimed is:

1. A work vehicle with a suspended work implement unit, the vehicle comprising:
    a raising/lowering mechanism for supporting the work implement unit for vertical movement;
    a manually-operated control device for vertically moving the work implement unit; and
    a stroke adjustment mechanism for locking the work implement unit with a predetermined stroke position in cooperation with the raising/lowering mechanism based on operational movement of the manually-operated control device, the stroke adjustment mechanism including:
        a rod having a longitudinal axis;
        a cam engaging unit mounted on the rod; and
        a cam member rotatable about longitudinal axis relative to the cam engaging unit and having:
            a passage portion for allowing passage of at least part of the cam engaging unit in a passage rotational phase,
            an inclined cam surface portion for producing relative rotation with the cam engaging unit through contact with the cam engaging unit in a cam movement rotational phase region; and
            a retaining portion for retaining the rod in a retaining rotational phase,
        wherein the passage rotational phase is produced through engagement between the cam engaging unit and the inclined cam surface portion caused by first operational movement of the manually-operated control device, and the rod is retained by the retaining portion.

2. The work vehicle as claimed in claim 1, wherein the cam engaging unit includes a first cam engaging member transversely projecting from the rod, and a second cam engaging member spaced from the first cam engaging member along the longitudinal axis and transversely projecting from the rod in a rotational phase different from that of the first cam engaging member, and
    wherein the inclined cam surface portion includes a first inclined cam surface for producing relative rotation with the cam engaging unit through contact with the first cam engaging member in a first cam movement rotational phase region, and a second inclined cam surface for producing relative rotation with the cam engaging unit through contact with the second cam engaging member in a second cam movement rotational phase region.

3. The work vehicle as claimed in claim 2, wherein the stroke adjustment mechanism includes a tubular housing, the cam member is a ring member rotatably fitted into the housing, and the rod extends through the ring member and projects from one end of the housing with one end or the other end thereof being connected to a vehicle body of the work vehicle.

4. A work vehicle with a suspended work implement unit, the vehicle comprising:
    a raising/lowering mechanism for supporting the work implement unit for vertical movement;
    a manually-operated control device for vertically moving the work implement unit; and
    a stroke adjustment mechanism for locking the work implement unit with a predetermined stroke position in cooperation with the raising/lowering mechanism based on operational movement of the manually-operated control device, the stroke adjustment mechanism including:
        a rod having a longitudinal axis;
        a cam engaging unit mounted on the rod; and
        a cam member for producing relative rotation with the cam engaging unit through contact with the cam engaging unit in a cam movement rotational phase region, the cam member having an inclined cam portion for retaining the work implement unit in a retaining position through first operational movement of the manually-operated control device for moving the work implement unit from a basic position to a far-side position beyond the retaining position and then returning the work implement unit to the retaining position, and for allowing the work implement unit to return to the basic position through second operational movement of the manually-operated control device for moving the work implement unit from the retaining position to the far-side position and then returning the work implement unit to the retaining position.

5. The work vehicle as claimed in claim 4, wherein the work implement unit is a mower unit suspended from a vehicle body between front wheels and rear wheels, and the manually-operated control device is a pedal operated by a driver's foot.

6. A stroke adjustment mechanism comprising:
    a rod having a longitudinal axis;
    a cam engaging unit mounted on the rod, the cam engaging unit including a first cam engaging member transversely projecting from the rod, and a second cam engaging member spaced from the first cam engaging member along the longitudinal axis and transversely projecting from the rod in a rotational phase different from that of the first cam engaging member; and
    a cam member rotatable about the longitudinal axis relative to the cam engaging unit and having:
        a passage portion for allowing passage of the second cam engaging member in a passage rotational phase,
        a first inclined cam surface for producing relative rotation with the cam engaging unit through contact with the first cam engaging member in a first cam movement rotational phase region, a second inclined cam surface for producing relative rotation with the cam engaging unit through contact with the second cam engaging member in a second cam movement rotational phase region, and a retaining portion for retaining the rod in the direction of the longitudinal axis in a retaining rotational phase.

7. The stroke adjustment mechanism as claimed in claim 6, wherein the retaining portion is a retaining surface continued from the second inclined cam surface to receive an end surface of the second cam engaging member.

8. The stroke adjustment mechanism as claimed in claim 6, wherein the cam member is a tubular member fitted on the rod, and the passage portion is a through opening for allowing passage of the second cam engaging member.

9. The stroke adjustment mechanism as claimed in claim 8, wherein the through opening has a shape adapted to an outer contour of the second cam engaging unit to guide stroke movement of the second cam engaging unit.

10. The stroke adjustment mechanism as claimed in claim 6, wherein an amount of the relative rotation produced by the first inclined cam surface through the first cam movement rotational phase region is equal to an amount of the relative rotation produced by the second inclined cam surface through the second cam movement rotational phase region.

11. The stroke adjustment mechanism as claimed in claim 6, wherein the first inclined cam surface is provided in one end surface side of the cam member, and the second inclined cam surface is provided in the other end surface side of the cam member.

12. The stroke adjustment mechanism as claimed in claim 6, wherein the first inclined cam surface and the second inclined cam surface are provided in plurality in a circumferential direction of the longitudinal axis, and the retaining portion is formed between adjacent two of the second inclined cam surfaces.

13. The stroke adjustment mechanism as claimed in claim 6, wherein the first inclined cam surface and the second inclined cam surface are formed as two pairs of wings provided in a rotationally symmetric manner relative to the longitudinal axis, respectively.

14. The stroke adjustment mechanism as claimed in claim 6, wherein a tubular member is provided for covering the cam member to be rotatable and unmovable in the direction of the longitudinal axis, the rod being extendable and contractable relative to the tubular member.

* * * * *